United States Patent Office 2,994,698
Patented Aug. 1, 1961

2,994,698
PROCESS FOR THE PRODUCTION OF BORON-NITROGEN COMPOUNDS
Friedrich Schubert and Konrad Lang, Leverkusen, Germany, assignors to Farbenfabriken Bayer Aktiengesellschaft, Leverkusen, Germany, a corporation of Germany
No Drawing. Filed Apr. 1, 1959, Ser. No. 803,353
Claims priority, application Germany Apr. 5, 1958
11 Claims. (Cl. 260—290)

The present invention relates to an improved and efficient process of producing boron-nitrogen compounds.

Copending application Ser. No. 761,667 which was filed on September 18, 1958, in the name of Konrad Lang, Friedrich Schubert and Dieter Goerrig, describes a process for the production of boron-nitrogen compounds which may carry organic substituents on the nitrogen atom, by contacting ammonium salts, which may be organically substituted on the nitrogen atom, and alkali metal or alkaline-earth metal boranates in the presence of liquid ammonia or liquid amines and filtering off the precipitated alkali metal or alkaline-earth metal salts. This reaction produces first a possibly organically substituted ammonium boranate ($[R_3NH]BH_4$) which splits off hydrogen so that borazane ($R_3N.BH_3$) is obtained:

(1)  $[R_3NH]X + MeBH_4 \rightarrow [R_3NH]BH_4 + MeX$ (2)  $[R_3NH]BH_4 \rightarrow R_3N.BH_3 + H_2$ wherein R is H, an aromatic or aliphatic radical and X is an acid radical.

In the process described in said copending application Ser. No. 761,667 borazanes ($R_3N.BH_3$) are obtained by reacting alkali metal or alkaline-earth metal boranates with ammonium salts, which may be organically substituted ($[R_3NH]X$), and amine ($R_3'N$) if the amine $R_3N$ is more volatile than $R_3'N$ and/or if the borazane $R_3N.BH_3$ is thermally less stable than $R_3'N.BH_3$:

(3)
$MeBH_4 + [R_3NH]X + R_3'N$

According to copending application Ser. No. 787,838 which was filed January 20, 1959, in the name of Eberhard Zirngiebl and Alex Bürger, and which application is assigned to the assignee of the present application, metal complex boranates are produced by reacting metal compounds wherein the metal is combined in complex form, or metal compounds which are dissolved in a complex-forming solvent, with alkali metal or alkaline-earth metal boranates. Boranates of cationic complexly bound heavy metals are obtained. Complexly bound boranates of e.g., zinc, cadmium, chromium, manganese, cobalt and nickel are obtainable in this manner. These complex metal boranates are excellent starting materials for the production of borazanes.

In accordance with the present invention it has been found that boron-nitrogen compounds are obtained by reacting a boranate of a metal complex boranates, preferably transition metal boranates, which may contain organic amines as complex ligands, preferably in liquid ammonia or organic amines or heterocyclic bases as solvents, in such a manner that the metal bound in complex form is converted into an insoluble salt and/or the boranate of the same metal complex boranate is decomposed by reaction of the complex ligands.

According to a preferred embodiment of the invention, the metal combined in complex form is converted into a compound which is less soluble than the metal complex boranate (4)

wherein m is the valency of the central atom; n is the coordination number of the central atom; Me is the central atom, R is H, an aliphatic or aromatic radical; Lig is the complex ligand; X is an acid radical.

In the second reaction phase the ammonium boranate is converted into the borazane by splitting off hydrogen:

(5)  $[R_3NH]BH_4 \rightarrow R_3N.BH_3 + H_2$

To ensure that the reactions proceed in the desired direction and so as to give optimum yields, definite conditions have to be chosen:

(1) *Choice of the solvent* ($R_3N$)

It is of advantage to choose as solvent the amine which is the amine component of the borazane to be produced. According to Equation 4 the ammonium boranate derived from the solvent is formed in the primary step of the reaction. If the amine acting as a ligand (lig.) is more strongly basic than the solvent, a second boranate [Lig. H]BH₄ is formed in a concurrent reaction. Another observation disclosed in said copending application Ser. No. 761,667, is however of essentially greater importance for the further course of the reaction; i.e. that type of borazane will be formed, the amine component of which is the least volatile of the possible amines which can be used or which is most stable among the possible borazanes which can be formed. If it is desired, however, to produce very stable borazanes, which are fast to water wherein they are insoluble or substantially insoluble (in this case, the amine combined in the complex as a ligand component), water can be used as solvent or suspending agent respectively.

(2) *Choice of the precipitant* (HX)

The system represented by the Equations 4 and 5 is displaced by some operations in the direction of the borazane formation. In Equation 4, the formation of the metal salt ($MeX_m$) which is very sparingly soluble in the solvent used and the elimination of the amine bonded as a ligand (lig.) from the reaction mixture promote the formation of the desired ammonium boranate. In Equation 5, the splitting off of hydrogen effects displacement of equilibrium.

As a result of the slight solubility of the complex boranates in the solvents to be used and the stability of the complexes, the number of free metal ions in the solution is low. The desired displacement of equilibrium can be accomplished by adopting two methods: (a) precipitation of an extremely sparingly soluble metal salt; especially suitable for this purpose are the sulfides, e.g. $H_2S$ or solutions of $H_2S$ in the amines ($R_3N$) as a precipitant; and (b) the decomposition of the complex boranate by removing the ligands, i.e. conversion into ammonium salts, or into free $CO_2$ or carbonates, if carbonato complexes are used or into organic derivatives if amine complexes are used.

In order to obtain optimum results it is of advantage to use precipitants having only a moderate acidity, i.e. precipitants which do not attack the $BH_4^-$ or $BH_3$-grouping and moreover do not have an oxidizing action on these two groups and do not lead to the formation of water which is relevant when operating in an anhydrous system. A precipitant combining all these properties is $H_2S$. Besides, most ammonium sulfides are unstable compounds so that excess $H_2S$ can often be removed from the amine solutions very easily by distillation.

(3) *Choice of the ligand* (lig.)

The properties of the complex ligands to be used in the process of the invention may vary within wide limits; care has to be taken only, as is set forth in said copending application Ser. No. 761,667 in respect of volatility and borazane stability.

When observing the aforesaid conditions extraordinarily good yields of borazane are obtained. As described in the example below, the yields are in most cases 100% of the theoretical or only slightly lower. Such high yields could hitherto not be obtained by other processes. Another advantage brought about by the herein described process resides in the fact that also very sensitive borazanes the amine component of which is e.g. a primary or secondary amine and which tend to split off hydrogen, can be obtained in a yield of 100%. These phenomena are in particular due to the very mild reaction conditions. Besides, the process of the invention allows of producing substantially all borazanes by the use of ordinary laboratory devices as well as technical apparates.

In the following example general instructions are given for the production of boron-nitrogen compounds.

*Example.*—In a three-necked flask equipped with a reflux condenser a stirrer and a gas inlet pipe, a metal amine boranate is suspended in an organic amine in such a quantity so as to form a thin suspension which can easily be stirred. Hydrogen sulfide (purified by means of a $Na_2S$ solution and dried over $CaCl_2$) is passed into the suspension until a sample of the precipitate does not evolve hydrogen any longer after addition of an acid. The suspension is then filtered and the excess amine is removed from the filtrate by distillation. The borazane can if desired be further purified by distillation or dissolving in ether, shaking with charcoal and evaporation. Because of the ready volatility of the $(CH_3)_2NH$, the production of N-dimethylborazane is preferably accomplished by shaking the reaction mixture twice with ether, purifying it with active carbon and evaporation. Pure borazane is thus obtained.

Borazane is obtained e.g. in the following yields:

| Complex boranate | Reaction components or solvent resp. | Borazane | Yield of the theoretical, Percent |
|---|---|---|---|
| $[Cd(NH_3)_6](BH_4)_2$ | $(C_2H_5)_3N$ | $(C_2H_5)_3N.BH_3$ | 100 |
| $[Cd(NH_3)_6](BH_4)_2$ | $(CH_3)_2NH$ | $(CH_3)_2NH.BH_3$ | 100 |
| $[Zn(NH_3)_4](BH_4)_2$ | $C_5H_5N$ (pyridine) | $C_5H_5N.BH_3$ | 94 |
| $[Zn(NH_3)_4](BH_4)_2$ | $(C_2H_5)_3N$ | $(C_2H_5)_3N.BH_3$ | 100 |
| $[Cd(CH_3NH_2)_6](BH_4)_2$ | $(C_2H_5)_3N$ | $(C_2H_5)_3N.BH_3$ | 98 |

What we claim is:

1. Process for preparing $(C_2H_5)_3N.BH_3$, which comprises treating $[Cd(NH_3)_6].(BH_4)_2$ suspended in $$(C_2H_5)_3N$$

with hydrogen sulfide and recovering $(C_2H_5)_3N.BH_3$.

2. Process for preparing $(CH_3)_2NH.BH_3$ which comprises treating $[Cd(NH_3)_6](BH_4)_2$ suspended in $$(CH_3)_2NH$$

with hydrogen sulfide and recovering $(CH_3)_2NH.BH_3$.

3. Process for preparing pyridine borane $C_5H_5N.BH_3$ which comprises treating $[Zn(NH_3)_4](BH_4)_2$ suspended in pyridine $C_5H_5N$ with hydrogen sulfide and recovering pyridine borane $C_5H_5N.BH_3$.

4. Process for preparing $(C_2H_5)_3N.BH_3$ which comprises treating $[Zn(NH_3)_4](BH_4)_2$ suspended in $$(C_2H_5)_3N$$

with hydrogen sulfide and recovering $(C_2H_5)_3N.BH_3$.

5. Process for preparing $(C_2H_5)_3N.BH_3$ which comprises treating $[Cd(CH_3NH_2)_6](BH_4)_2$ suspended in $$(C_2H_5)_3N$$

with hydrogen sulfide and recovering $(C_2H_5)_3N.BH_3$.

6. A process for preparing amine boranes having the general formula $R_3N.BH_3$ wherein $R_3N$ represent a nitrogen containing compound selected from the group consisting of secondary and tertiary lower alkyl amines, pyridine and ammonia which comprises reacting a borohydride of a cationic complexly bound heavy metal selected from the group consisting of zinc, cadmium, manganese and nickel having a complex coordinate linking radical between the borohydride anion and heavy metal cation with a sulfide in a liquid nitrogen-containing base $R_3N$, defined as above, as solvent, and recovering the amine borane thereby formed.

7. A process according to claim 6 in which said liquid nitrogen-containing base is a member selected from the group consisting of secondary and tertiary lower alkyl amines.

8. A process according to claim 7, in which said alkyl amine is $(CH_3)_2NH$.

9. A process according to claim 6, in which said liquid nitrogen-containing base is ammonia.

10. A process according to claim 6, in which said liquid nitrogen-containing base is pyridine.

11. A process according to claim 6, in which said sulfide is hydrogen sulfide.

References Cited in the file of this patent

UNITED STATES PATENTS 2,898,379   Chamberlain et al. _____ Aug. 4, 1959

UNITED STATES PATENT OFFICE
CERTIFICATE OF CORRECTION

Patent No. 2,994,698                  August 1, 1961

Friedrich Schubert et al.

It is hereby certified that error appears in the above numbered patent requiring correction and that the said Letters Patent should read as corrected below.

Column 1, line 57, strike out "boranates"; line 63, strike out "boranate".

Signed and sealed this 17th day of April 1962.

(SEAL)
Attest:

ESTON G. JOHNSON

Attesting Officer

DAVID L. LADD

Commissioner of Patents